(No Model.) 2 Sheets—Sheet 2.
B. E. CHOLLAR.
METER TESTING MACHINE.
No. 565,838. Patented Aug. 11, 1896.
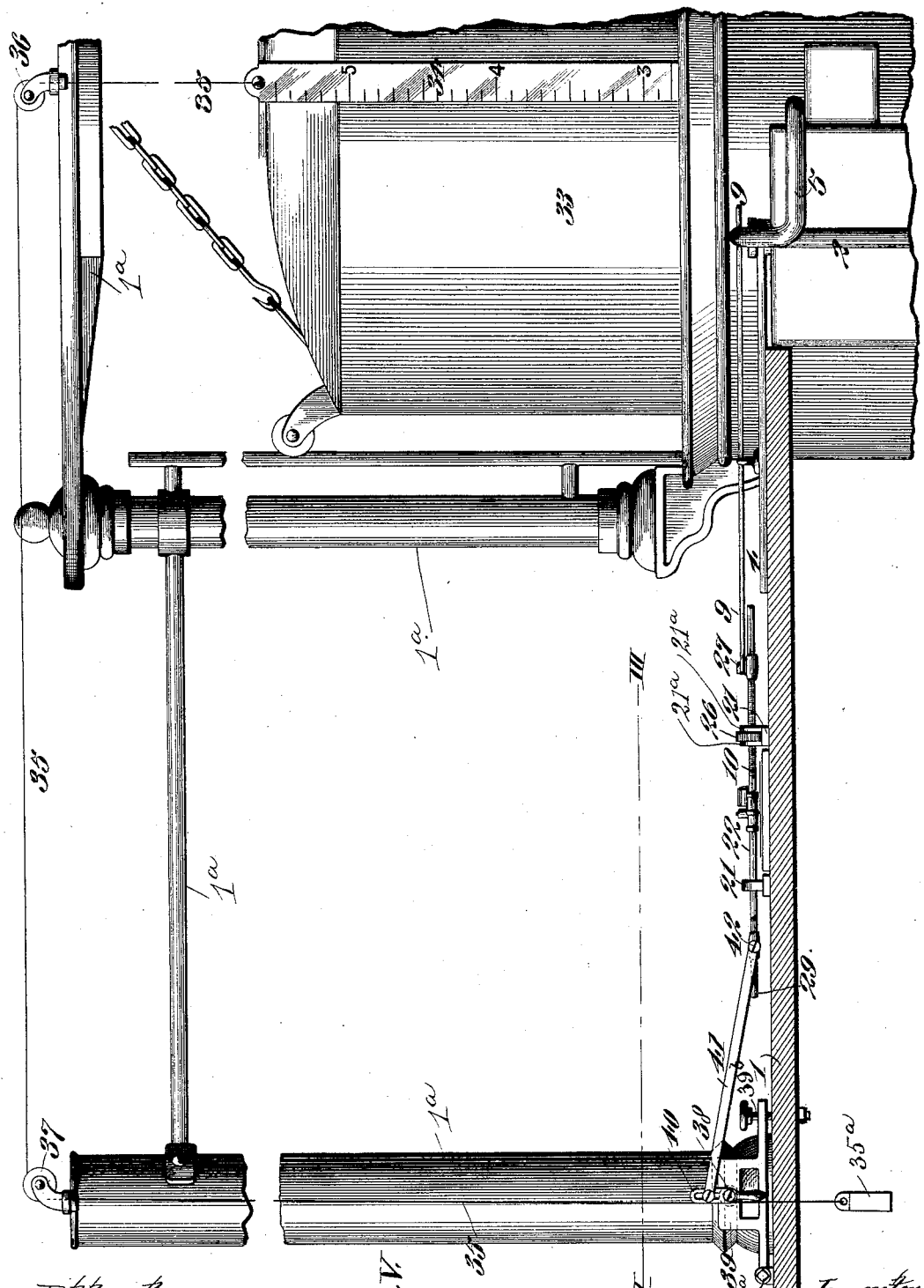
Fig. V.
Attest: Inventor
Byron E. Chollar.
Stanley Stoner By Knight & Bro
Att'ys

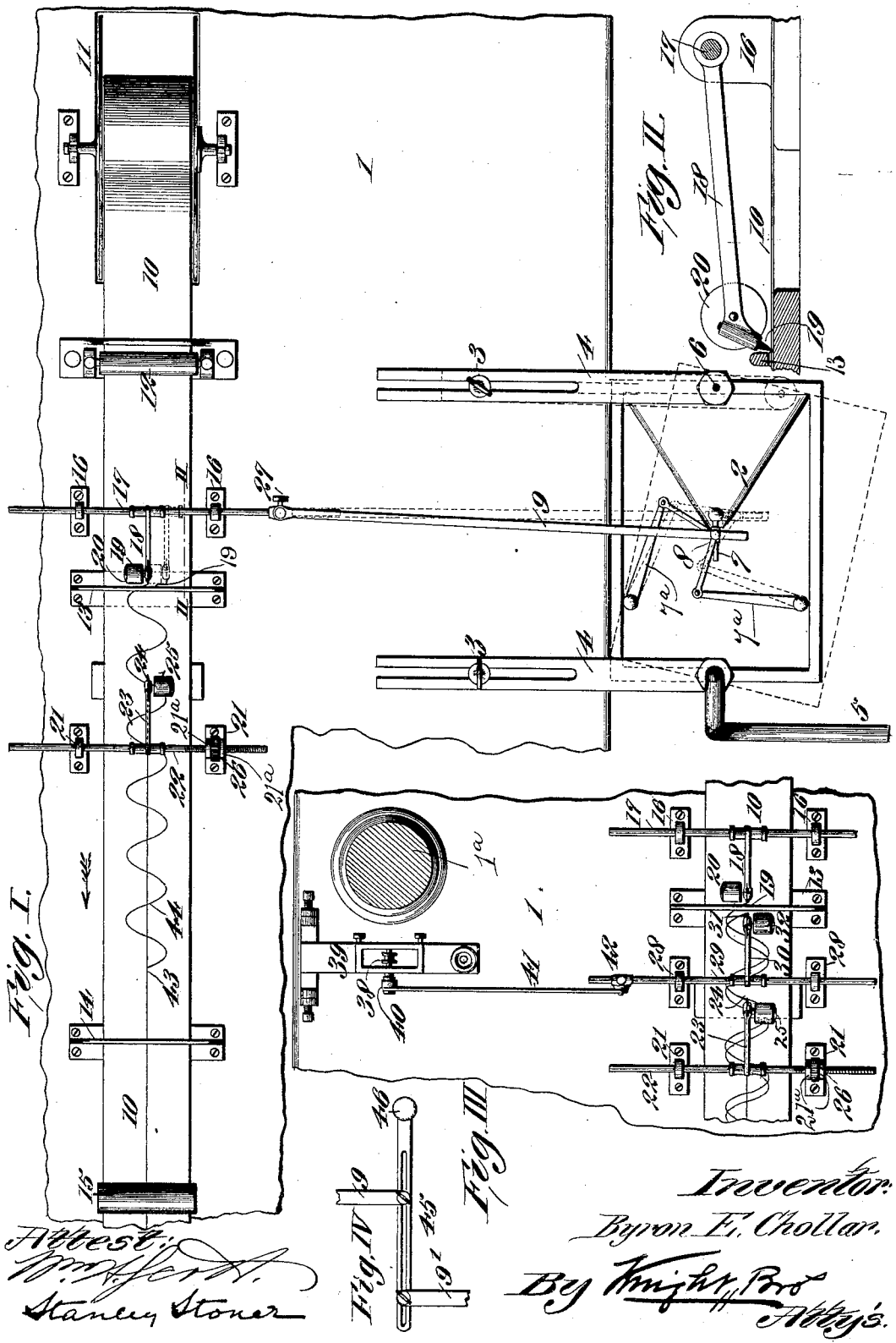

UNITED STATES PATENT OFFICE.

BYRON E. CHOLLAR, OF ST. LOUIS, MISSOURI.

METER-TESTING MACHINE.

SPECIFICATION forming part of Letters Patent No. 565,838, dated August 11, 1896.

Application filed November 14, 1895. Serial No. 568,901. (No model.)

*To all whom it may concern:*

Be it known that I, BYRON E. CHOLLAR, a citizen of the United States, residing at the city of St. Louis, in the State of Missouri, have invented a certain new and useful Improvement in Meter-Testing Machines, of which the following is a full, clear, and exact description, reference being had to the accompanying drawings, forming a part of this specification.

The object of my invention is to provide a device for the purpose of testing the accuracy of gas or other meters. Such meters are often imperfectly constructed, and are, therefore, inaccurate in their registration of the amount of gas which passes through them.

My object is to provide a device which will detect any errors in the meter, and also keep a record of them. I accomplish this by means of the mechanism shown in the accompanying drawings, in which—

Figure I illustrates a top or plan view of the recording apparatus and the position of the meter while being tested. Fig. II is an enlarged side elevation of one of the markers, taken along the line II II of Fig. I. Fig. III is a top view of a second recording device, taken along the line III III of Fig. V, said recording device being used for the purpose of verifying the first. Fig. IV is a top view of the compound lever used for propelling the recording-pencil in the case of very large meters. Fig. V is a side elevation of the device.

1 is the table upon which the device rests. 2 is the meter to be tested, which is secured for that purpose to the table 1 by means of the thumb-screws 3 engaging the slotted bars 4. The gas enters the meter through the feed-pipe 5, Figs. I and II, and is exhausted through the pipe 6. As the gas passes through the meter-valves the crank 7 is caused to revolve by the motion of said valves. 7ª are the valve-cranks of the meter. To this crank 7 is pivoted at 8 a rod 9, and its rotary motion is by means of this crank converted into a backward and forward motion.

10 is a strip of paper, and 11 is a reel upon which said paper is wound, Fig. I. By means of any suitable mechanism this strip of paper is drawn at a uniform speed under the roller 12 and through the guides 13 and 14 and out under the roller 15. To accomplish this I prefer to use a small Edison motor. Supported on standards 16, on each side of this paper strip, is a movable rod 17, to which movable rod is secured an arm 18, bearing a pencil 19. 20 is a weight attached to said arm to keep the same depressed.

21 are standards similar to 16, placed to the left thereof, as shown, and supporting a rod 22. This likewise carries fixed thereon an arm 23 and a pencil 24, held down by a weight 25. The rod 22 is threaded at one end, and the arm 23 and the pencil 24 are placed and held in a desired fixed position by means of the adjusting-nut 26. As the paper travels from right to left this pencil 24 makes a straight mark down its middle.

To the end of the rod 17 is attached the rod 9 by means of the screw 27. It will be readily seen that as the rod 17 is moved back and forth by the rod 9 it will cause the pencil 19 to leave a wave-line on the moving paper 10.

A third set of standards 28 support a rod 29 situated between rods 22 and 17. It also carries an arm 30 and pencil 31, kept depressed by weight 32.

33 is a small reservoir or gasometer, conveniently situated, the capacity of which is very carefully shown on the graduated scale 34. Gas is fed from said reservoir through pipe 5 to the meter to be tested. Attached to said reservoir is a wire 35, which passes over pulleys 36 37, said pulleys being properly supported on a suitable framework 1ª. The other end of this wire 35 is attached to a weight 35ª and the wire is wound around a spindle 38, placed in an adjustable frame 39, attached to the table 1 by means of a hinge-bearing 39ª at one end and a screw-bolt 39ᵇ at the other end. As the gas is exhausted from reservoir 33 and the reservoir sinks the drawing of the wire 35 by the weight causes the spindle 38 to revolve. The said spindle carries a crank 40, to which, by means of a slot and set-screw, is attached the rod 41. This rod 41 is attached to the rod 29 by means of a screw 42. It will thus be seen that the pencil 31 will describe a second wave down the moving paper strip 10, said pencil being propelled by means of the movement of the said rod 41. The meter 2 to be tested is secured to the table 1 by means of the bars 4. The rod 9 is then attached to the crank 7 and the paper strip 10 is started in motion. Gas is passed through the meter from pipe 5, and the motion imparted to the pencil 19 causes a wave-line, as shown, to be drawn upon the moving paper. The capacity of the chamber varies in different meters, consequently the same number of wave crests and troughs per cubic foot will not be shown in the different meters. In the drawings are shown six waves, supposed to be the result of the one cubic foot of gas passing through the meter. After the apparatus is started the pencil 24 is adjusted by means of the milled nut 26, which is confined between cheek-plates 21ª, so as to describe a straight line directly between crest and trough of the wave. The distance from this line to the crest ought to equal the distance to the trough. Any variation will show a defect in the adjustment. A complete rotation of the crank 7 will describe a complete wave, say from the point 43 to point 44. This will indicate that all the valves are used once, the portion of the wave above the line described by pencil 24 showing one half the meter and that below the line the other half. If one varies from the other it will show that one meter-chamber is unequal to the other.

The pencil 31, describing a second wave and operated as described, provides a convenient means of comparison of the first wave made by a pencil operated by the meter. The number of these waves per cubic foot is regulated by the diameter of the spindle 38 to correspond with the number described by the marker 19. The height of the wave is regulated by the adjustment of the crank-pin and slot. As the same body of gas now controls the movement of both pencils, the two lines should be isometric. The line described by pencil 31, being controlled by exhaustion of gas in reservoir 33 and without the intervention of meter 2, will be symmetrical. Any variation from this in the line described by pencil 19 will indicate that there is a fault somewhere in said meter.

It is easier to detect a fault in the line midway between crest and trough than upon said crest or trough. In this case the meter may then be placed at an angle to the table by means of the slotted bar 4 and set-screw 3, as shown in dotted lines in Fig. I. This will throw a break in the symmetry of the wave, which otherwise would be at the crest or trough, somewhere between the crest and trough.

When a very large meter is to be tested, the length of motion of rod 17 might be greater than the width of the paper 10. I then divide the rod 9 into two parts 9 and 9', Fig IV, and attach these parts by means of set-screws to an arm 45, attached to the table 1 on a pivot 46. By this means I shorten the length of the motion of rod 17.

The apparatus shown in Fig. I will afford in itself a complete test for the accuracy of the meter. The third device (shown in Fig. III) may or may not be used in connection therewith.

My device affords a means of keeping a permanent record of individual meters, so as to show any variation in the registration of the same from time to time, as well as to test new or faulty meters.

While I have described my invention as adapted for testing meters for measuring ordinary illuminating-gas, I do not limit myself to this use, as it may be used for testing other volumes. As a matter of fact, I use air in making the ordinary tests.

I claim as my invention—

1. A meter-testing machine comprising a support for a meter, a strip traveling over the support, a sliding rod located over the strip, a weighted arm pivoted to the sliding rod and carrying a marker, a reciprocating rod whereby the sliding rod is connected directly to the meter, an adjustable rod located over the strip, and a weighted arm pivoted to the adjustable rod carrying a marker; substantially as described.

2. A meter-testing machine comprising a support for a meter, a strip traveling over the support, a sliding rod located over the strip, a weighted arm pivoted to the sliding rod and carrying a marker, a reciprocating rod whereby the sliding rod is connected directly with the valve-crank of the meter, a gasometer, a frame, a spindle having a crank-arm and carried by the frame, a connection between the spindle and the gasometer, and a rod connecting the sliding rod with the crank-arm; substantially as described.

3. The combination, with a gas-containing reservoir; of means for conveying the gas from said reservoir through a meter, a crank operated by the valves of said meter, means for recording the motion of said crank upon a moving strip, a second crank operated directly by the movement of said reservoir, and means for recording the motion of the second crank upon said moving strip isometric with said first record; substantially as described.

4. The combination of a moving strip, a meter, a crank operated by the opening and closing of the valves of said meter, a rod attached to said crank, a marker carried on said rod and adapted to impress said moving strip, a reservoir adapted to furnish a supply of gas to pass through said meter, a spindle carrying a second crank, a wire attached to said reservoir and passing over pulleys to said spindle, an arm attached to said second crank, a marker attached to said arm and adapted to impress said moving strip isometric with said first marker, and a third marker adapted to draw a straight line down said moving strip, and midway between the extremes of the wave-lines described by said other markers; substantially as described.

B. E. CHOLLAR.

In presence of—
E. S. KNIGHT,
W. FINLEY.